(12) United States Patent
Weese et al.

(10) Patent No.: US 11,861,839 B2
(45) Date of Patent: Jan. 2, 2024

(54) PREPROCESSING MEDICAL IMAGE DATA FOR MACHINE LEARNING

(71) Applicant: KONINKLIJKE PHILIPS N.V., Eindhoven (NL)

(72) Inventors: Rolf Jürgen Weese, Norderstedt (DE); Alexandra Groth, Hamburg (DE); Tom Brosch, Hamburg (DE); Jochen Peters, Norderstedt (DE)

(73) Assignee: KONINKLIJKE PHILIPS N.V., Eindhoven (NL)

( * ) Notice: Subject to any disclaimer, the term of this patent is extended or adjusted under 35 U.S.C. 154(b) by 640 days.

(21) Appl. No.: 17/055,255

(22) PCT Filed: May 8, 2019

(86) PCT No.: PCT/EP2019/061770
§ 371 (c)(1),
(2) Date: Nov. 13, 2020

(87) PCT Pub. No.: WO2019/219466
PCT Pub. Date: Nov. 21, 2019

(65) Prior Publication Data
US 2021/0217164 A1    Jul. 15, 2021

(30) Foreign Application Priority Data

May 14, 2018    (EP) .................................... 18172162

(51) Int. Cl.
*G06T 7/11*    (2017.01)
*G06N 20/00*    (2019.01)
(Continued)

(52) U.S. Cl.
CPC ............... *G06T 7/11* (2017.01); *G06N 20/00* (2019.01); *G06T 7/0012* (2013.01);
(Continued)

(58) Field of Classification Search
CPC ..................... G06T 7/11; G06T 7/0012; G06T 2207/20081; G06T 2207/30048;
(Continued)

(56) References Cited

U.S. PATENT DOCUMENTS 8,144,950 B2    3/2012    Peters et al.
8,170,309 B2    5/2012    Nishiura et al.
(Continued)

FOREIGN PATENT DOCUMENTS

| CN | 102760236 A | 10/2012 |
| WO | 2017091833 A1 | 6/2017 |

OTHER PUBLICATIONS

International Search Report and Written Opinion for International Application No. PCT/EP2019/061770, filed May 8, 2019, 14 pages.
(Continued)

*Primary Examiner* — Neil R McLean (57) ABSTRACT

A system and computer-implemented method are provided for preprocessing medical image data for machine learning. Image data is accessed which comprises an anatomical structure. The anatomical structure in the image data is segmented to obtain a segmentation of the anatomical structure as a delineated part of the image data. A grid is assigned to the delineated part of the image data, the grid representing a partitioning of an exterior and interior of the type of anatomical structure using grid lines, wherein said assigning comprises adapting the grid to fit the segmentation of the anatomical structure in the image data. A machine learning algorithm is then provided with an addressing to the image data in the delineated part on the basis of coordinates in the assigned grid. In some embodiments, the image data of the anatomical structure may be resampled using the assigned grid. Advantageous, a standardized addressing to the image data of the anatomical structure is provided, which may (Continued)

reduce the computational overhead of the machine learning, require fewer training data, etc.

20 Claims, 4 Drawing Sheets

(51) Int. Cl.
*G06T 7/00* (2017.01)
*G06V 10/82* (2022.01)
*G06V 10/46* (2022.01)
*G06V 20/64* (2022.01)

(52) U.S. Cl.
CPC ............ *G06V 10/469* (2022.01); *G06V 10/82* (2022.01); *G06V 20/64* (2022.01); *G06T 2207/20081* (2013.01); *G06T 2207/30048* (2013.01)

(58) Field of Classification Search
CPC .......... G06T 2207/20084; G06T 2207/30004; G06N 20/00; G06V 10/469; G06V 10/82; G06V 20/64; G06V 2201/031
USPC ....................................................... 382/128
See application file for complete search history.

(56) References Cited

U.S. PATENT DOCUMENTS

| | | | |
|---|---|---|---|
| 9,042,620 B2 | 5/2015 | Kohlberger et al. | |
| 9,129,390 B2 | 9/2015 | Dewaele | |
| 10,136,972 B2* | 11/2018 | Sabina | ................ A61C 7/002 |
| 2008/0304744 A1 | 12/2008 | Peters et al. | |
| 2009/0196474 A1 | 8/2009 | Nishiura et al. | |
| 2010/0189320 A1 | 7/2010 | Dewaele | |
| 2011/0213598 A1* | 9/2011 | Matov | ................... G06T 17/20 |
| | | | 703/7 |
| 2012/0230572 A1 | 9/2012 | Kohlberger et al. | |

OTHER PUBLICATIONS

Lindell, et al., "Development of Mammogram Computer-Aided Diagnosis Systems Using Optical Processing Technology", Applied Imagery Pattern Recognition Workshop, Proceedings, 29th Oct. 16-18, 2000, pp. 173-179.

Ecabert, et al., "Automatic Model-based Segmentation of the Heart in CT Images" IEEE Transactions on Medical Imaging 2008, vol. 27, Issue 9, 1189-1201. (Abstract).

Brosch, et al., "Foveal fully convolutional nets for multi-organ segmentation", SPIE 2018, Proceedings vol. 10574, Medical Imaging 2018. (Abstract).

* cited by examiner

PREPROCESSING MEDICAL IMAGE DATA FOR MACHINE LEARNING

CROSS-REFERENCE TO RELATED APPLICATIONS

This application is the U.S. National Phase application under 35 U.S.C. § 371 of International Application No. PCT/EP2019/061770, filed on May 8, 2019, which claims the benefit and priority to European Application No. 18172162.2, filed May 14, 2018. These applications are hereby incorporated by reference herein, for all purposes.

FIELD OF THE INVENTION

The invention relates to a system and a computer-implemented method for preprocessing medical image data for machine learning.

The invention further relates to a workstation and imaging apparatus comprising the system, and to a computer-readable medium comprising instructions for causing a processor system to perform the computer-implemented method.

BACKGROUND OF THE INVENTION

Machine learning is playing an increasingly important role in the medical domain. For example, machine learning techniques such as deep learning have been found to be highly suitable for classification and segmentation of image content in medical image processing. As is known per se, such machine learning may be trained using training data as input. After such training, a trained machine learning algorithm may be applied to new data, e.g., to obtain a prediction from the new data. Such a prediction may take various forms. For example, if the machine learning algorithm is applied to image data, the prediction may represent a classification or segmentation of an anatomical structure in the image data.

One of the many possible applications of machine learning is scar identification in the myocardium of the left ventricle. For example, for each part of the image data representing the myocardium, e.g., for each voxel, it may be determined if this part represents healthy tissue or scar tissue. Based on the classification, leads for left ventricular pacing may then be placed. Another application of machine learning is the identification of substructures of an already segmented organ. For example, the outer hull of the prostate may be segmented. Machine learning may then be used to determine for each image part within the outer hull whether it belongs to the central zone, transition zone, peripheral zone, stroma, urethra, etc.

A problem for both the training and subsequent applying of a machine learning algorithm is that the input data may not always be provided in an optimal manner. For example, if images of an anatomical structure from different patients are used as training input, the different images may show the anatomical structure in different ways, e.g., due to inter-patient variability, different anatomical poses, etc., but also due to variability in the image acquisition, e.g., causing the anatomical structure to have a different position in each of the images. Although machine learning can also learn to cope with such variability, this may increase the computational overhead of the algorithm, require more training data, etc.

The publication 'Development of mammogram computer-aided diagnosis systems using optical processing technology' by Scott Lindell et al, 2000, describes an automated analysis of mammograms for cancerous masses. In a digitized mammogram, regions of interest are identified by comparing four band-passed images with the original image and looking for "peaks". Bright spots of specific sizes and shapes are then selected and passed to a ROI analyzer for analysis. The ROI analyzer overlays a grid with the ROI centered on the questionable density. This grid is a radial-polar grid with the angles evenly spaced and constant radial increments. The average value of all pixels in each subgrid is input into a neural network to evaluate ROIs for their degree of suspicion of cancer.

The publication 'Learning image context for Segmentation of the prostate in CT-guided radiotherapy' by Wei Li et al, 2012, describes a patient-specific classification method to segment the prostate from 3D CT images by incorporating both appearance features and context features into an online learning framework. Herein, a different classifier for each local region of the prostate is learned, rather than a single global classifier for the whole prostate. These local classifiers are named as location-adaptive classifiers, and are placed along two coordinate directions around the prostate region in the extracted ROI.

However, this may not sufficiently address the problem of input data for a machine learning algorithm being provided in a sub-optimal manner.

SUMMARY OF THE INVENTION

It would be advantageous to obtain a system and method which provides an improved pre-processing of medical image data for machine learning.

In accordance with a first aspect of the invention, a system is provided for preprocessing medical image data for machine learning, the system comprising:
   an image data interface configured to access image data, the image data comprising an anatomical structure;
   a memory comprising instruction data representing a set of instructions;
   a processor configured to communicate with the image data interface and the memory and to execute the set of instructions, wherein the set of instructions, when executed by the processor, cause the processor to:
   segment the anatomical structure in the image data to obtain a segmentation of the anatomical structure as a delineated part of the image data;
   assign a grid to the delineated part of the image data, the grid representing a partitioning of an exterior and interior of the type of anatomical structure using grid lines, wherein said assigning comprises adapting the grid to fit the segmentation of the anatomical structure in the image data; and
   provide a machine learning algorithm with an addressing to the image data in the delineated part on the basis of coordinates in the assigned grid.

A further aspect of the invention provides a workstation or imaging apparatus comprising the system.

A further aspect of the invention provides a computer-implemented method of preprocessing medical image data for machine learning, the method comprising:
   accessing image data comprising an anatomical structure;
   segmenting the anatomical structure in the image data to obtain a segmentation of the anatomical structure as a delineated part of the image data;
   assigning a grid to the delineated part of the image data, the grid representing a partitioning of an exterior and interior of the type of anatomical structure using grid lines, said assigning comprising adapting the grid to fit the segmentation of the anatomical structure in the image data; and providing a machine learning algorithm with an addressing to the image data in the delineated part on the basis of coordinates in the assigned grid.

A further aspect of the invention provides a computer-readable medium comprising transitory or non-transitory data representing instructions arranged to cause a processor system to perform the computer-implemented method.

The above measures provide an image data interface configured to access image data showing an anatomical structure, such as a tissue, a part of an organ, organ system, etc. In some embodiments, the image data may be patient data acquired by various imaging modalities, including but not limited to CT and MRI, positron emission tomography, SPECT scanning, ultrasonography, etc.

A processor is provided which is configurable by instructions stored in a memory to segment the anatomical structure in the image data. Such segmentation is known per se, and any suitable segmentation technique may be used, including but not limited to so-called model-based segmentation. By segmenting the anatomical structure in the image data, the exterior of the anatomical structure may be identified in the image data, e.g., in the form of a contour or other type of delineation of the image data of the anatomical structure from its background. As a further consequence thereof, the position, size, pose, etc. of the exterior of the anatomical structure in the image data may be made known to the processor.

Having identified the (delineated) part of the image data which represents the anatomical structure, the processor may assign a grid to the image data of the anatomical structure. Such a grid may provide a partitioning of the exterior and interior of the anatomical structure by way of the grid lines, but with the grid and thus the partitioning being predefined for the particular type of anatomical structure and thereby effectively representing a 'standardized' partitioning. The assigning of the grid may then involve adapting the grid to the particular anatomical structure in the image data on the basis of the earlier segmentation.

Such adapting is also referred to as 'adapting the grid to fit the segmentation', and may refer to the adaptation of the grid in terms of position, size and shape to the segmentation, and thereby to the outline, of the anatomical structure in the image data. Such 'fitting' is elsewhere also referred to as 'matching'. The fitting to the shape of the anatomical structure may elsewhere also be referred to as a fitting to the 'pose' of the anatomical structure, referring to a patient-specific appearance of the anatomical structure in the image data. For example, in case the image data is volumetric image data, the grid may be a 3D grid in which the distribution of grid lines is selected such that grid cells have an approximately equal size when the grid is applied to an atlas representation of the anatomical structure, e.g., to a standardized representation of the anatomical structure. Another example is that the distribution of grid lines may be selected, e.g., manually, along internal structures of the standardized representation of the anatomical structure.

The assigned grid may be used to enable the machine learning algorithm to access the image data of the anatomical structure in a standardized manner. Such access is conventionally not standardized, as image data is conventionally accessed based on coordinates in the image's sampling grid which normally is a regular Cartesian grid which is not adapted to the anatomical structure of interest. See for example the regular sampling grid depicted in FIG. 2.

Accordingly, there is conventionally no, or least no unequivocal, relation between an image coordinate and the anatomical structure: a given image coordinate may provide access to the image data of different parts of the anatomical structure across different images, or not provide access to the image data of the anatomical structure of interest at all. Although a machine learning algorithm may learn to cope with such variability in the relation between image coordinate and the actual image data of the anatomical structure of interest, this may increase the computational overhead of the algorithm, require more training data, etc.

By way of the claimed measures, a standardized addressing to the image data of the anatomical structure is provided to the machine learning algorithm, namely on the basis of the grid coordinates of the assigned grid. See for example FIG. 3. By the grid being assigned to the anatomical structure, substantially all grid coordinates may provide access to the image data of the anatomical structure of interest, rather than to other (surrounding) image data. Since image data outside of the anatomical structure is not addressable via the grid coordinates, it is thereby not directly accessible and thereby effectively 'cropped out' from the image data. An accessing entity, such as the machine learning algorithm, will thus only or substantially only encounter image data of the anatomical structure when accessing the image data via the grid-based addressing. Moreover, as the grid provides a standardized partitioning of the anatomical structure, the image data accessed at a particular coordinate may now have a constant, or relatively constant, anatomical meaning. For example, a particular grid coordinate may always denote a same anatomical landmark within the anatomical structure, e.g., an origin of a cusp of a heart valve. Advantageously, this may reduce the computational overhead of the machine learning algorithm, require fewer training data, etc.

The grid-based addressing may be established 'on the fly'. For example, a request to a particular grid coordinate may be translated by the processor to a particular image coordinate on the basis of the assigned grid.

In an embodiment, the set of instructions, when executed by the processor, cause the processor to resample the image data of the anatomical structure using the assigned grid to obtain resampled image data which is directly accessible at the coordinates of the assigned grid. Rather than providing the grid-based addressing on the fly, the image data may also be resampled beforehand in accordance with the assigned grid. For example, the grid may be directly used as (re) sampling grid, or may provide a coarse structure from which a finer sampling grid may be derived. An advantage of explicit resampling may be that computational effort may be shifted before the execution of the machine learning algorithm rather than during the execution of the machine learning algorithm.

Optionally, the set of instructions, when executed by the processor, cause the processor to execute the machine learning algorithm using the image data of the anatomical structure as input. For example, the image data of the anatomical structure may be used as training input to the machine learning algorithm, or the image data of the anatomical structure may represent new data to which the machine learning algorithm may be applied, e.g., to classify or segment the anatomical structure by means of the machine learning algorithm. In this respect, it is noted that a later segmentation by the machine learning algorithm may differ quantitatively and/or qualitatively from the earlier segmentation performed for the specific purpose of assigning the grid to the anatomical structure.

Optionally, the set of instructions, when executed by the processor, cause the processor to assign the grid to the delineated part of the image data based on anatomical landmarks in the image data which are identified by said segmentation of the anatomical structure. It is known per se to identify anatomical landmarks in the image data by way of segmentation. For example, the image data may be segmented using a segmentation model for the type of anatomical structure, and the segmentation model may comprise labels corresponding to the anatomical landmarks. Based on the location of these anatomical landmarks, the grid may then be adapted and applied to the image data of the anatomical structure.

Optionally, the system further comprises a grid data interface to a database which comprises grid data defining the grid, and the set of instructions, when executed by the processor, cause the processor to access the grid data from the database via the grid data interface. In some embodiments, the database may comprise grid data of different grids representing partitionings of an exterior and interior of different types of anatomical structures using grid lines, and the processor may specifically access the grid data of the type of anatomical structure shown in the image data based on said identification of the anatomical structure, e.g., as provided by the segmentation.

In some embodiments, the database comprises grid data of different grids which represent partitionings of an exterior and interior of the type of anatomical structure using grid lines for different medical applications, and the processor may obtain an identification of a current medical application, and access the grid data of the type of anatomical structure shown in the image data and corresponding to the current medical application, based on the identification of the anatomical structure and the current medical application. For example, different grids may be defined of the heart in which different levels of detail is provided of the supply territories of the coronary arteries, e.g., fewer and more detail. Depending on the medical application, a grid may be selected providing lower- or higher-resolution in those territories.

Optionally, the system further comprises a display interface to a display, and the set of instructions, when executed by the processor, cause the processor to, via the display interface, establish a visualization of the assigned grid on the display. For example, the visualization may be an overlay of the assigned grid over the delineated part of the image data. This may enable the user to verify the correct functioning of the system in as far as providing the machine learning algorithm with a suitable addressing to the image data based on the assigned grid.

It will be appreciated by those skilled in the art that two or more of the above-mentioned embodiments, implementations, and/or optional aspects of the invention may be combined in any way deemed useful.

Modifications and variations of the workstation, the imaging apparatus, the method and/or the computer program product, which correspond to the described modifications and variations of the system, can be carried out by a person skilled in the art on the basis of the present description.

A person skilled in the art will appreciate that the system and method may be applied to multi-dimensional image data, e.g. to two-dimensional (2D), three-dimensional (3D) or four-dimensional (4D) images, acquired by various acquisition modalities such as, but not limited to, standard X-ray Imaging, Computed Tomography (CT), Magnetic Resonance Imaging (MRI), Ultrasound (US), Positron Emission Tomography (PET), Single Photon Emission Computed Tomography (SPECT), and Nuclear Medicine (NM).

BRIEF DESCRIPTION OF THE DRAWINGS

These and other aspects of the invention will be apparent from and elucidated further with reference to the embodiments described by way of example in the following description and with reference to the accompanying drawings, in which.

It should be noted that the figures are purely diagrammatic and not drawn to scale. In the figures, elements which correspond to elements already described may have the same reference numerals.

LIST OF REFERENCE NUMBERS

The following list of reference numbers is provided for facilitating the interpretation of the drawings and shall not be construed as limiting the claims.

020 database
022 data communication
030 image data
040 grid data
060 display
062 display data
080 user input device
082 user input data
100 system for preprocessing of medical image data
120 input interface for image data, grid data
122 internal data communication
140 processor
142 internal data communication
144 internal data communication
160 memory
180 user interface subsystem
182 display output interface
184 user input interface
200 image data
210 image data of anatomical structure
220 regular grid
222 horizontal grid line
224 vertical grid line
300 image data
310 image data of anatomical structure
320 grid applied to anatomical structure
322, 324 grid lines
400 segmentation model 500 method of preprocessing of medical image data
510 accessing image data of anatomical structure
520 segmenting the anatomical structure
530 assigning a grid to image data of anatomical structure
540 providing addressing to image data based on grid
600 computer-readable medium
610 non-transitory data

DETAILED DESCRIPTION OF EMBODIMENTS

Figure 1:
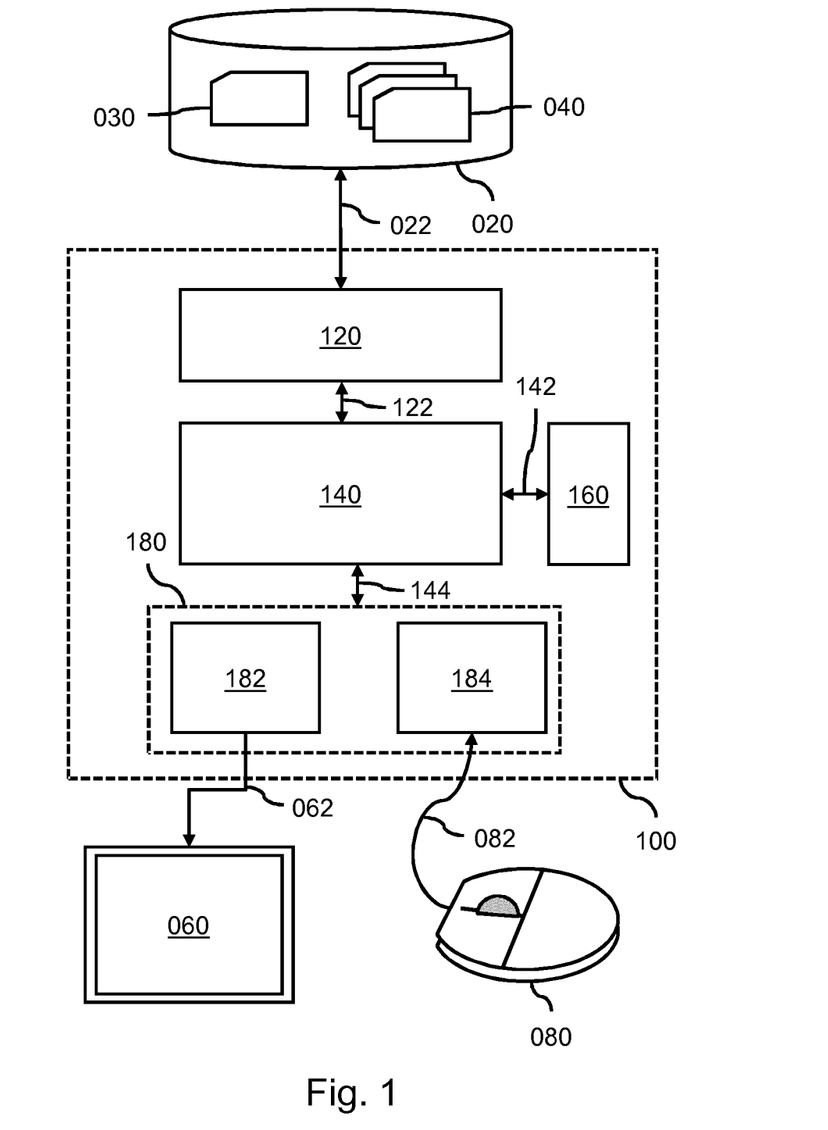
FIG. 1 shows a system for preprocessing of medical image data for machine learning, to which a display and a user input device is connected.

FIG. 1 shows a system 100 for preprocessing medical image data for machine learning. The system 100 comprises an input interface 120 configured to access the medical image data. Accordingly, the input interface 120 may be considered an embodiment of an image data interface. In the example of FIG. 1, the input interface 120 is shown to be connected to an external database 020 which comprises the medical image data, namely as image data 030 showing an anatomical structure. The database 020 may, for example be constituted by, or be part of, a Picture Archiving and Communication System (PACS) of a Hospital Information System (HIS) to which the system 100 may be connected or comprised in. Accordingly, the system 100 may obtain access to the image data 030 via external data communication 022. Alternatively, the image data 030 may be accessed from an internal data storage of the system 100 (not shown).

In general, the input interface 120 may take various forms, such as a network interface to a local or wide area network, e.g., the Internet, a storage interface to an internal or external data storage, etc.

The system 100 is further shown to comprise a processor 140 configured to internally communicate with the input interface 120 via data communication 122, and a memory 160 accessible by the processor 140 via data communication 142. The processor 140 is further shown to internally communicate with a user interface subsystem 180 via data communication 144.

The processor 140 may be configured to, during operation of the system 100, segment the anatomical structure in the image data 030 to identify the anatomical structure as a delineated part of the image data, assign a grid to the delineated part of the image data, the grid representing a standardized partitioning of the type of anatomical structure, and provide a machine learning algorithm with an addressing to the image data in the delineated part on the basis of coordinates in the assigned grid. This operation of the system 100, and various optional aspects thereof, will be explained in more detail with reference to FIGS. 2-4.

FIG. 1 also shows various optional system components. For example, the system 100 may further comprise a grid data interface to a database which comprises grid data defining the grid, with the processor 140 accessing the grid data via the grid data interface, e.g., instead of accessing the grid data locally or generating the grid 'on the fly'. In the example of FIG. 1, the system 100 is shown to access the grid data 040 in a same database 020 and via a same input interface 120 as used to access the image data 030. Alternatively, a separate image data interface and grid data interface may be provided. In general, the image data 030 and the grid data 040 may be accessed from a same location, e.g., a same database 020 as in the case of FIG. 1, but also from different locations, e.g., from different databases.

As another optional aspect, the system 100 may comprise a user interface subsystem 180 which may be configured to, during operation of the system 100, enable a user to interact with the system 100, for example using a graphical user interface. The user interface subsystem 180 is shown to comprise a user input interface 184 configured to receive user input data 082 from a user input device 080 operable by the user. The user input device 080 may take various forms, including but not limited to a computer mouse, touch screen, keyboard, microphone, etc. FIG. 1 shows the user input device to be a computer mouse 080. In general, the user input interface 184 may be of a type which corresponds to the type of user input device 080, i.e., it may be a thereto corresponding type of user device interface 184.

The user interface subsystem 180 is further shown to comprise a display output interface 182 configured to provide display data 062 to a display 060 to visualize output of the system 100. In the example of FIG. 1, the display is an external display 060. Alternatively, the display may be an internal display.

In general, the system 100 may be embodied as, or in, a single device or apparatus, such as a workstation or imaging apparatus or mobile device. The device or apparatus may comprise one or more microprocessors which execute appropriate software. The software may have been downloaded and/or stored in a corresponding memory, e.g., a volatile memory such as RAM or a non-volatile memory such as Flash. Alternatively, the functional units of the system, e.g., the input interface, the optional user input interface, the optional display output interface and the processor, may be implemented in the device or apparatus in the form of programmable logic, e.g., as a Field-Programmable Gate Array (FPGA). In general, each functional unit of the system may be implemented in the form of a circuit. It is noted that the system 100 may also be implemented in a distributed manner, e.g., involving different devices or apparatuses. For example, the distribution may be in accordance with a client-server model, e.g., using a server and a thin-client.

Figure 2:
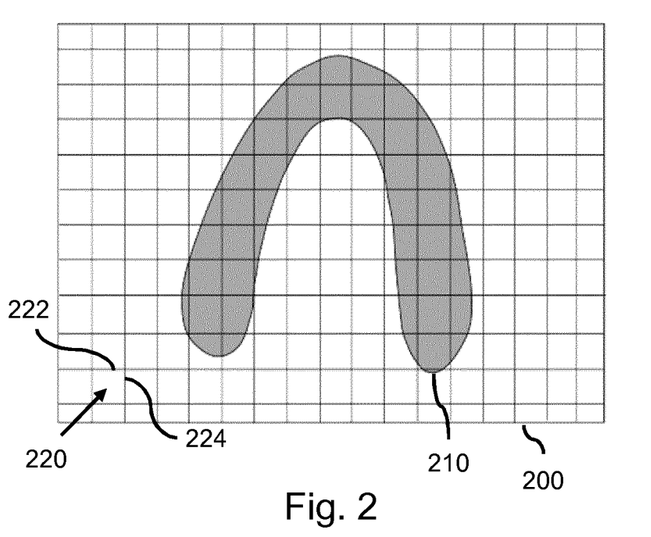
FIG. 2 shows an image comprising an anatomical structure, being in this example the left ventricular myocardium, with a regular grid being overlaid over the image, the regular grid representing the sampling grid of the image data.

FIG. 2 shows a schematic representation of a medical image 200 which comprises an anatomical structure 210 in the form of the left ventricular myocardium. It is noted that for ease of interpretation of FIG. 2, the surroundings of the anatomical structure 210 are not shown but normally also contained in the medical image 200. In the example of the left ventricular myocardium, these may be blood pools, etc.

The image data constituting the medical image 200 may be comprised of an array of image elements such as pixels together representing a 2D image or voxels together representing a volumetric image. Such image elements may represent discrete samples, with the array of image elements representing a grid of samples and with the relative position of samples being defined by a sampling grid.

FIG. 2 illustrates schematically such a sampling grid 220 of the medical image 200, which is normally a regular Cartesian grid comprised of horizontal 222 and vertical grid lines 224 and which normally does not take the image contents into account. It is noted that for ease of interpretation of FIG. 2, the sampling grid 220 is shown coarsely, e.g., having relatively few grid lines. Normally, the sampling grid 220 corresponds to the image resolution, e.g., for an image of 2048×2048 pixels, the sample grid may be considered to be a regular grid of 2048×2048 grid lines. The addressing to the image data is based on grid coordinates, e.g., (0,0) for the image element at the top-left corner to (2047, 2047) at the bottom-right corner.

In accordance with the invention as claimed, a normalized addressing to the image data of the anatomical structure is provided by way of a grid which is assigned to a segmentation of the anatomical structure in the medical image.

Figure 3:
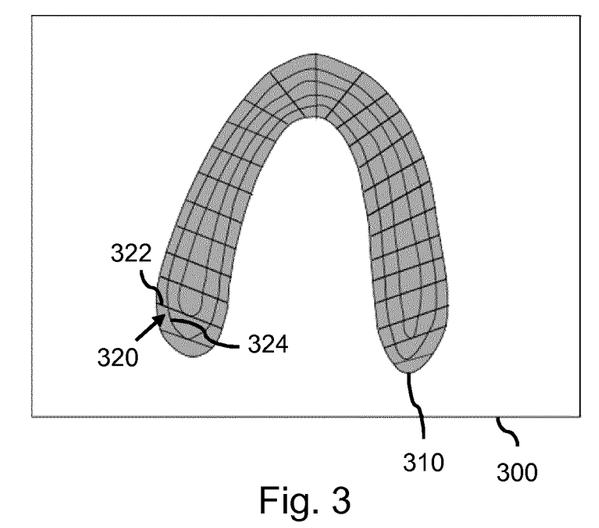
FIG. 3 shows a grid which has been assigned to the anatomical structure and which may be used to enable a machine learning algorithm to access the image data of the anatomical structure in a more optimal manner.

This is illustrated in FIG. 3, where a grid 320 is assigned to the image data of the anatomical structure 310. The grid may be specific to the particular type of anatomical structure 310, e.g., specific to a left ventricular myocardium, and may provide a standardized partitioning of the anatomical structure by means of grid lines 322, 324. It is noted that the grid lines 322, 324 of the unassigned grid (not shown in FIG. 3) typically do not define a regular grid but rather may follow, in terms of exterior outline, a standard shape of the anatomical structure, e.g., as represented by an anatomical atlas, while the interior of the grid may follow interior structures within the anatomical structure or provide another type of standardized partitioning of the anatomical structure, e.g., into cells of equal size in the unassigned grid. Effectively, the grid 320 may be optimized for being applied to a particular type of anatomical structure, and in some embodiments, also for a particular medical application.

The machine learning algorithm may be provided access to the image data of the anatomical structure 310 on the basis of coordinates of the grid 320. For example, if the machine learning algorithm accesses the image data sequentially, e.g., based on read-outs at coordinates from (0,0), (0,1), . . . , (0, n), the machine learning algorithm may for example access the image data of an outer layer of the left ventricular myocardium 310, rather than in the FIG. 2 example the top-most row of the medical image 200 which does show the anatomical structure 200 at all.

In general, a grid may be predefined for an anatomical structure, e.g., an organ of interest, and optionally also for a particular medical application. A grid may be generated in various ways. For example, the general shape of the grid may be learned from a cohort of patients whereas the number of grid points/lines and their relative positions within the grid may be manually determined or automatically based on certain cost functions. The predefined grid may be stored as grid data so that it may be accessed by the system when required. Multiple predefined grids may be provided, e.g., for different types of anatomical structures, and/or for a particular type of anatomical structure for different types of medical applications.

For example, a grid may be defined, and then later selected from the database, to be a high-resolution mesh with boundaries that correspond to the typical American Heart Association (AHA) segments. Alternatively, a grid may be chosen to be a high-resolution mesh with boundaries that correspond in more detail to the supply territories of the coronary arteries, for example, if the medical application requires more detail in these regions. As there are a few different variants of coronary artery anatomy, the grid may also be chosen in dependence of the anatomy of the actual coronary anatomy variant of the image or patient at hand. It is noted that although the above refers to the anatomical structure being a heart, similar considerations apply to other anatomical structures, such as the brain. Another example is that the grid resolution may be chosen in dependence of the image acquisition protocol, e.g., lower resolution for 3D US compared to CT. In the case of 2D acquisitions, the definition of the grid may depend on the actual view, e.g., 2-chamber view, 3-chamber view, 4-chamber view or axis view.

In a specific example, a normalized grid may be generated in a manner as described in '*Integrating Viability Information into a Cardiac Model for Interventional Guidance*' by Lehmann et al, FIMH 2009, pp. 312-320, 2009, for the construction of a volumetric mesh in the left ventricle, see section 3.3. This approach is not limited to the left ventricle and may also be used for other structures.

Figure 4:
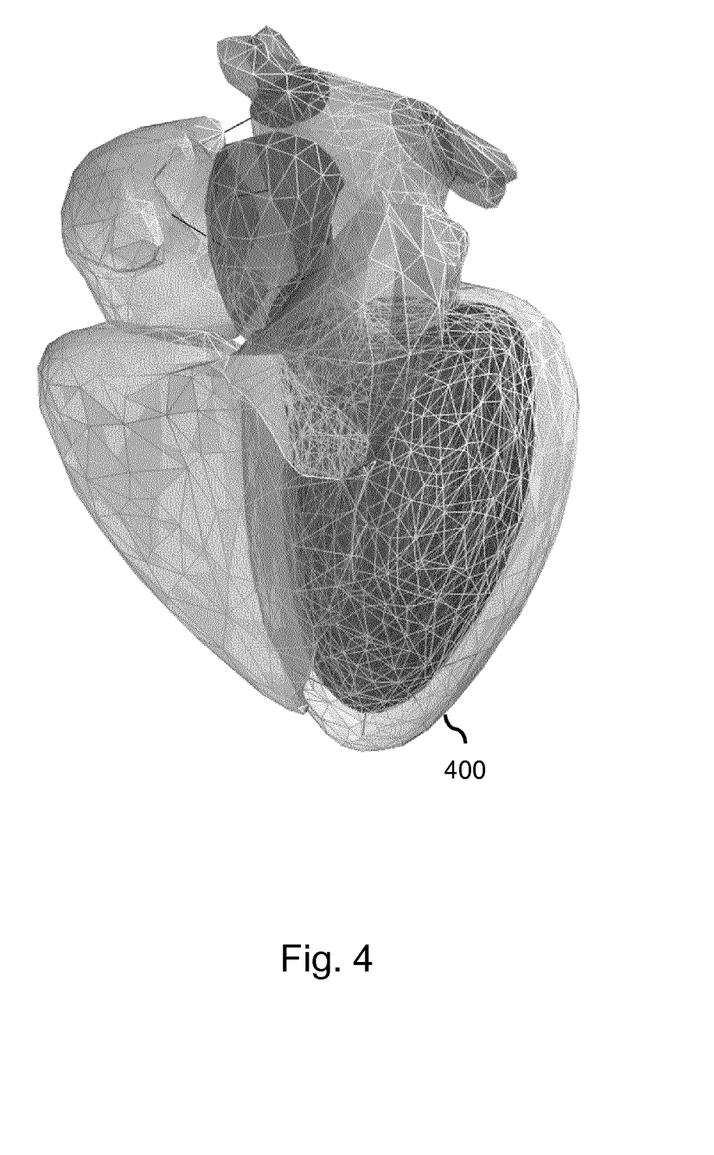
FIG. 4 shows a segmentation model which may be used to segment an anatomical structure in image data so as to enable the assignment of the grid.

To enable the assignment of the predefined grid to the image data of an anatomical structure, e.g., of a patient, the anatomical structure may be segmented in the medical image. For that purpose, known segmentation algorithms and techniques may be used, as are known per se from the field of medical image analysis. One example of a class of segmentation algorithms is model-based segmentation, in which prior knowledge may be used for segmentation, see, e.g., "*Automatic Model-based Segmentation of the Heart in CT Images*" by Ecabert et al., IEEE Transactions on Medical Imaging 2008, 27(9), pp. 1189-1201. FIG. 4 shows an example of such a segmentation model, being in this example a heart model.

The predefined grid may then be assigned to the image data of the anatomical model and thereby effectively adapted to the particular position and pose of the anatomical structure. For example, anatomical landmarks may be used to guide the adaption of the grid. Such anatomical landmarks may be identified in the image data using the segmentation. In a specific example, the segmentation may be performed by a segmentation model which comprises anatomical landmarks. The patient's anatomical landmarks are now known from the applied segmentation model, which provides the processor with information on the position, size and pose of the anatomical structure in the medical image data. Parts of the grid may be linked to these anatomical landmarks, on which basis the grid may then be applied to the medical image and in particular the anatomical structure contained therein. In another specific example, the segmentation may be an atlas-based segmentation as described in '*Atlas-based image segmentation: A Survey*' by Kalinic et al., 2009, and may thus be based on image registration of an atlas image to the medical image.

Next to the use of anatomical landmarks provided by segmentation, various other ways of fitting a grid to the image data of an anatomical structure on the basis of a segmentation of the anatomical structure are equally within reach of the skilled person. For example, there may exist correspondences between the segmentation model and the grid which may not necessarily represent anatomical landmarks. Another example is that the predefined grid may have a specific shape and that the grid may be adapted to match the segmentation of the anatomical structure while using a cost function which attempts to minimize certain deformations to the grid. Yet another example is that the segmentation may provide a geometric structure which may be converted into, or even used directly as the grid. For example, if the segmentation is performed using a segmentation model, the geometric primitives of the segmentation model may be processed, e.g., by tessellation which is constrained to provide a same mesh topology also for slightly different shapes, to generate the grid. In some embodiments, such a segmentation model may directly provide the grid, e.g., with its vertices defining grid points.

Having assigned the grid to the image data of the anatomical structure, the machine learning algorithm may be executed, e.g., by the system itself or by another entity. Effectively, the grid may be used to provide an 'on the fly' addressing. Alternatively, the image data may be resampled in correspondence with the grid before the machine learning algorithm is executed. In this case, the assigned grid may effectively be used as a resampling grid specifying at which locations the original medical image is to be sampled. Such resampling is known per se, and may comprise converting the original discrete image samples into a continuous surface, e.g., by image reconstruction, and then resampling the continuous surface at the positioned indicated by the sampling grid. Such image reconstruction may be performed using interpolation, e.g., bicubic interpolation in case of 2D image data or tri-cubic interpolation in case of 3D image data. The resampled image data may then be used as input the machine learning algorithm instead of the original image data.

It is noted that providing 'on the fly' addressing may also be considered a form of resampling, namely one in which the resampling is performed on the fly in response to the image data being requested at a particular grid coordinate.

In general, such resampling may effectively 'crop out' non-relevant image data and avoid partial volume effects. In addition to passing the resampled image to a machine learning algorithm, the coordinates within this predefined grid may be used by the machine learning since they now have an anatomical meaning. Whether these coordinates are passed as additional channel or inferred from the layout of the sampled image intensities may depend on the software architecture. The former may be explained as follows with reference to the left ventricular myocardium, which as an anatomical structure may be described by a coordinate system indicating height h, angle phi and distance d from epicardial wall. These coordinates may be associated with the resampled grid and may be passed together with (on the fly) resampled intensity values I to the neural network. In other words, instead of using only intensities I, a vector (I, h, phi, d) may be used as input.

With respect to the machine learning algorithm, it is noted that the claimed measures may be applied to any machine learning algorithm which uses medical image data of an anatomical structure as input. For example, depending on the application, different types of neural networks may be used to carry out an image or voxel-wise classification task. For example, the resampled image can be used as input to a foveal fully convolutional network, e.g., as described in T. Brosch, A. Saalbach, "*Foveal fully convolutional nets for multi-organ segmentation*", SPIE 2018.

In general, the grid may provide a standardized and normalized partitioning of a type of anatomical structure. Such a grid may be predefined and stored, e.g., in the form of grid data, for a number of different anatomical structures and/or for a number of different medical applications. The assigned grid may be visualized to a user, e.g., using the aforementioned display output interface 182 of the system 100 of FIG. 1, for example as an overlay over the medical image.

Figure 5:
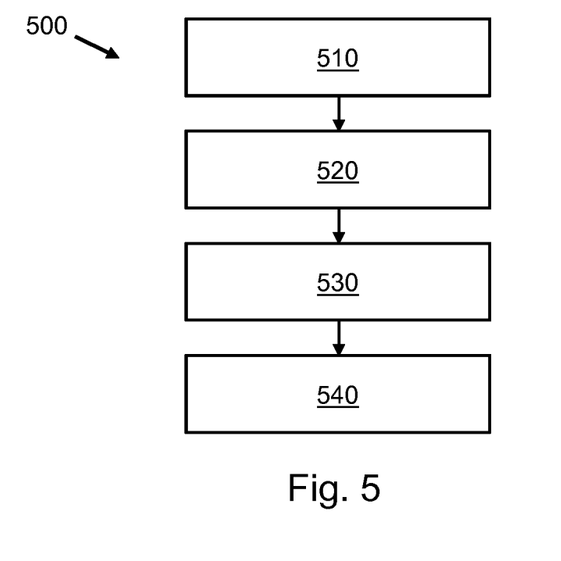
FIG. 5 shows a block-diagram of a computer-implemented method of preprocessing of medical image data for machine learning.

FIG. 5 shows a computer-implemented method 500 of preprocessing medical image data for machine learning. It is noted that the method 500 may, but does not need to, correspond to an operation of the system 100 as described with reference to FIG. 1 and others. The method 500 comprises, in an operation titled "ACCESSING IMAGE DATA OF ANATOMICAL STRUCTURE", accessing 510 image data comprising an anatomical structure. The method 500 further comprises, in an operation titled "SEGMENTING THE ANATOMICAL STRUCTURE", segmenting 520 the anatomical structure in the image data to obtain a segmentation of the anatomical structure as a delineated part of the image data. The method 500 further comprises, in an operation titled "ASSIGNING A GRID TO IMAGE DATA OF ANATOMICAL STRUCTURE", assigning 530 a grid to the delineated part of the image data, the grid representing a partitioning of an exterior and interior of the type of anatomical structure using grid lines, said assigning comprising adapting the grid to fit the segmentation of the anatomical structure in the image data. The method 500 further comprises, in an operation titled "PROVIDING ADDRESSING TO IMAGE DATA BASED ON GRID", providing 540 a machine learning algorithm with an addressing to the image data in the delineated part on the basis of coordinates in the assigned grid. It will be appreciated that, in general, the above operations may be performed in any suitable order, e.g., consecutively, simultaneously, or a combination thereof, subject to, where applicable, a particular order being necessitated, e.g., by input/output relations.

Figure 6:
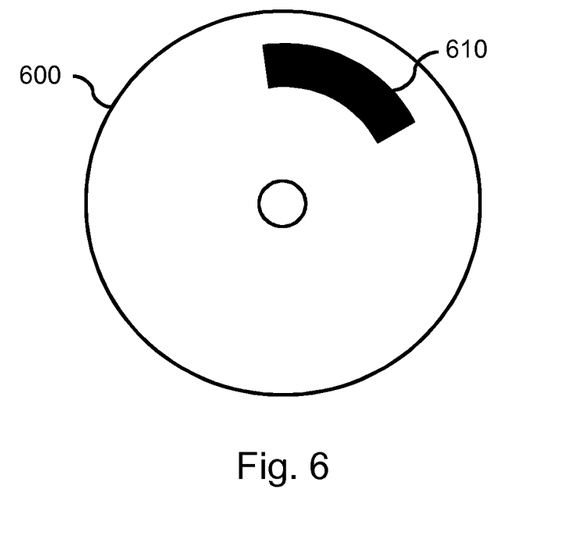
FIG. 6 shows a computer-readable medium comprising instructions.

The method 500 may be implemented on a computer as a computer implemented method, as dedicated hardware, or as a combination of both. As also illustrated in FIG. 6, instructions for the computer, e.g., executable code, may be stored on a computer readable medium 600, e.g., in the form of a series 610 of machine readable physical marks and/or as a series of elements having different electrical, e.g., magnetic, or optical properties or values. The executable code may be stored in a transitory or non-transitory manner. Examples of computer readable mediums include memory devices, optical storage devices, integrated circuits, servers, online software, etc. FIG. 6 shows an optical disc 600.

In accordance with an abstract of the present application, a system and computer-implemented method may be provided for preprocessing medical image data for machine learning. Image data may be accessed which comprises an anatomical structure. The anatomical structure in the image data may be segmented to identify the anatomical structure as a delineated part of the image data. A grid may be assigned to the delineated part of the image data, the grid representing a standardized partitioning of the type of anatomical structure. A machine learning algorithm may then be provided with an addressing to the image data in the delineated part on the basis of coordinates in the assigned grid. In some embodiments, the image data of the anatomical structure may be resampled using the assigned grid. Advantageous, a standardized addressing to the image data of the anatomical structure may be provided, which may reduce the computational overhead of the machine learning, require fewer training data, etc.

Examples, embodiments or optional features, whether indicated as non-limiting or not, are not to be understood as limiting the invention as claimed.

It will be appreciated that the invention also applies to computer programs, particularly computer programs on or in a carrier, adapted to put the invention into practice. The program may be in the form of a source code, an object code, a code intermediate source and an object code such as in a partially compiled form, or in any other form suitable for use in the implementation of the method according to the invention. It will also be appreciated that such a program may have many different architectural designs. For example, a program code implementing the functionality of the method or system according to the invention may be subdivided into one or more sub-routines. Many different ways of distributing the functionality among these sub-routines will be apparent to the skilled person. The sub-routines may be stored together in one executable file to form a self-contained program. Such an executable file may comprise computer-executable instructions, for example, processor instructions and/or interpreter instructions (e.g. Java instructions). Alternatively, one or more or all of the sub-routines may be stored in at least one external library file and linked with a main program either statically or dynamically, e.g. at run-time. The main program contains at least one call to at least one of the sub-routines. The sub-routines may also comprise function calls to each other. An embodiment relating to a computer program product comprises computer-executable instructions corresponding to each processing stage of at least one of the methods set forth herein.

These instructions may be sub-divided into sub-routines and/or stored in one or more files that may be linked statically or dynamically. Another embodiment relating to a computer program product comprises computer-executable instructions corresponding to each means of at least one of the systems and/or products set forth herein. These instructions may be sub-divided into sub-routines and/or stored in one or more files that may be linked statically or dynamically.

The carrier of a computer program may be any entity or device capable of carrying the program. For example, the carrier may include a data storage, such as a ROM, for example, a CD ROM or a semiconductor ROM, or a magnetic recording medium, for example, a hard disk. Furthermore, the carrier may be a transmissible carrier such as an electric or optical signal, which may be conveyed via electric or optical cable or by radio or other means. When the program is embodied in such a signal, the carrier may be constituted by such a cable or other device or means. Alternatively, the carrier may be an integrated circuit in which the program is embedded, the integrated circuit being adapted to perform, or used in the performance of, the relevant method.

It should be noted that the above-mentioned embodiments illustrate rather than limit the invention, and that those skilled in the art will be able to design many alternative embodiments without departing from the scope of the appended claims. In the claims, any reference signs placed between parentheses shall not be construed as limiting the claim. Use of the verb "comprise" and its conjugations does not exclude the presence of elements or stages other than those stated in a claim. The article "a" or "an" preceding an element does not exclude the presence of a plurality of such elements. The invention may be implemented by means of hardware comprising several distinct elements, and by means of a suitably programmed computer. In the device claim enumerating several means, several of these means may be embodied by one and the same item of hardware. The mere fact that certain measures are recited in mutually different dependent claims does not indicate that a combination of these measures cannot be used to advantage.

The invention claimed is:

1. A system for preprocessing medical image data for machine learning, the system comprising:
    an image data interface configured to access image data, the image data comprising an anatomical structure;
    a memory comprising instruction data representing a set of instructions;
    a processor configured to communicate with the image data interface and the memory and to execute the set of instructions, wherein the set of instructions, when executed by the processor, cause the processor to:
        segment the anatomical structure in the image data to obtain a segmentation of the anatomical structure as a delineated part of the image data;
        assign a grid to the delineated part of the image data, the grid representing a partitioning of an exterior and interior of the type of anatomical structure using grid lines, wherein said assigning comprises adapting the grid to fit the segmentation of the anatomical structure in the image data; and
        provide a machine learning algorithm with an addressing to the image data in the delineated part on the basis of coordinates in the assigned grid.

2. The system according to claim 1, wherein the set of instructions, when executed by the processor, cause the processor to resample the image data of the anatomical structure using the assigned grid to obtain resampled image data which is directly accessible at the coordinates of the assigned grid.

3. The system according to claim 1, wherein the set of instructions, when executed by the processor, cause the processor to execute the machine learning algorithm using the image data of the anatomical structure as input.

4. The system according to claim 3, wherein:
    the image data of the anatomical structure represents training data for the machine learning algorithm, or
    the image data of the anatomical structure represents new data to which the machine learning algorithm is applied.

5. The system according to claim 1, wherein the set of instructions, when executed by the processor, cause the processor to assign the grid to the delineated part of the image data based on anatomical landmarks in the image data which are identified by said segmentation of the anatomical structure.

6. The system according to claim 5, wherein the set of instructions, when executed by the processor, cause the processor to segment the image data using a segmentation model for the type of anatomical structure, wherein the segmentation model comprises labels corresponding to the anatomical landmarks.

7. The system according to claim 1, further comprising a grid data interface to a database which comprises grid data defining the grid, and wherein the set of instructions, when executed by the processor, cause the processor to access the grid data from the database via the grid data interface.

8. The system according to claim 7, wherein:
    the database comprises grid data of different grids representing partitionings of an exterior and interior of different types of anatomical structures using grid lines; and
    the set of instructions, when executed by the processor, cause the processor to access the grid data of the type of anatomical structure shown in the image data based on identification of the anatomical structure.

9. The system according to claim 7, wherein:
    the database comprises grid data of different grids, the different grids representing partitionings of an exterior and interior of the type of anatomical structure using grid lines for different medical applications; and
    the set of instructions, when executed by the processor, cause the processor to:
        obtain an identification of a current medical application, and
        access the grid data of the type of anatomical structure shown in the image data and corresponding to the current medical application, based on the identification of the anatomical structure and the current medical application.

10. The system according to claim 9, wherein the different grids representing partitionings of an exterior and interior of the type of anatomical structure for different medical applications differ at least locally in grid density.

11. The system according to claim 1, further comprising a display interface to a display, and wherein the set of instructions, when executed by the processor, cause the processor to, via the display interface, establish a visualization of the assigned grid on the display.

12. The system according to claim 11, wherein the visualization is an overlay of the assigned grid over the delineated part of the image data.

13. A workstation or imaging apparatus comprising the system according to claim 1.

14. A computer-implemented method of preprocessing medical image data for machine learning, the method comprising:
- accessing image data comprising an anatomical structure;
- segmenting the anatomical structure in the image data to obtain a segmentation of the anatomical structure as a delineated part of the image data;
- assigning a grid to the delineated part of the image data, the grid representing a partitioning of an exterior and interior of the type of anatomical structure using grid lines, said assigning comprising adapting the grid to fit the segmentation of the anatomical structure in the image data; and
- providing a machine learning algorithm with an addressing to the image data in the delineated part on the basis of coordinates in the assigned grid.

15. The computer-implemented method according to claim 14, further comprising:
- accessing grid data from a database comprising grid data which defines the grid, wherein the grid data is of different grids representing partitionings of an exterior and interior of different types of anatomical structures using grid lines; and
- wherein the accessed grid data is of the type of anatomical structure shown in the image data based on identification of the anatomical structure.

16. The computer-implemented method according to claim 15, wherein grid lines of the different types of anatomical structures are for different medical applications, and further comprising:
- obtaining an identification of a current medical application; and
- accessing the grid data of the type of anatomical structure shown in the image data and corresponding to the current medical application, based on the identification of the anatomical structure and the current medical application.

17. The computer-implemented method according to claim 14, further comprising establishing a visualization of the assigned grid on a display.

18. A non-transitory computer readable medium storing instructions that, when executed by one or more processors, cause the one or more processors to:
- access image data comprising an anatomical structure;
- segment the anatomical structure in the image data to obtain a segmentation of the anatomical structure as a delineated part of the image data;
- assign a grid to the delineated part of the image data, the grid representing a partitioning of an exterior and interior of the type of anatomical structure using grid lines, said assigning comprising adapting the grid to fit the segmentation of the anatomical structure in the image data; and
- provide a machine learning algorithm with an addressing to the image data in the delineated part on the basis of coordinates in the assigned grid.

19. The non-transitory computer readable medium according to claim 18, storing further instructions to:
- access grid data from a database comprising grid data which defines the grid, wherein the grid data is of different grids representing partitionings of an exterior and interior of different types of anatomical structures using grid lines; and
- wherein the accessed grid data is of the type of anatomical structure shown in the image data based on identification of the anatomical structure.

20. The non-transitory computer readable medium according to claim 19, wherein grid lines of the different types of anatomical structures are for different medical applications, and further storing instructions to:
- obtain an identification of a current medical application; and
- access the grid data of the type of anatomical structure shown in the image data and corresponding to the current medical application, based on the identification of the anatomical structure and the current medical application.

* * * * *